July 8, 1969  G. P. BECK ET AL  3,454,866
REGULATING TRANSFORMER ARRANGEMENT WITH TAP CHANGING MEANS
Filed June 20, 1967

WITNESSES
Bernard R. Giegny
James F. Young

INVENTORS
George P. Beck and
Stephen G. Vargo.
BY
Donald R. Lackey
ATTORNEY

3,454,866
REGULATING TRANSFORMER ARRANGEMENT WITH TAP CHANGING MEANS
George P. Beck, Sharon, Pa., and Stephen G. Vargo, Campbell, Ohio, assignors to Westinghouse Electric Corporation, Pittsburgh, Pa., a corporation of Pennsylvania
Filed June 20, 1967, Ser. No. 647,448
Int. Cl. H02p 13/06; H02m 5/12
U.S. Cl. 323—43.5                          8 Claims

ABSTRACT OF THE DISCLOSURE

Regulating transformer apparatus including an electrical transformer having a three-phase zig-zag winding, and auxiliary transformers which buck or boost the output voltage of the zig-zag winding without changing the phase angles of the zig-zag phase voltages. The auxiliary transformers include primary windings which obtain their excition voltage across the phases of the zig-zag winding, secondary windings having taps thereon, and load tap changer means. The voltages selected by the tap changer means on the tapped secondary windings are thus in phase with their associated zig-zag phase voltages, allowing these voltages to be added to, or subtracted from, their associated zig-zag phase voltages, without changing the phase angle thereof.

BACKGROUND OF THE INVENTION

Field of the inventon

The invention relates in general to electrical power transformer apparatus of the type having load tap changer means for adjusting the output voltage in response to voltage regulator means, and more specifically to transformer apparatus having a three-phase zig-zag connected winding whose output voltage is to be adjusted.

Description of the prior art

In the prior art, when the output voltage of power transformer apparatus having a three-phase, zig-zag connected secondary winding is to be regulated, either the primary winding of the power transformer is tapped and connected to load tap changer apparatus, which thus changes the volts per turn and regulates the output voltage of the zig-zag winding accordingly, or a series transformer is used which is excited from a tapped power winding section in the zig-zag configuration. Both of these approaches have disadvantages, as both involve bringing taps out of the power transformer. The former approach also has the further disadvantage of requiring more magnetic material in the magnetic core of the transformer, as the regulation is accomplished through the iron circuit of the transformer. This substantially increases the size, weight and cost of the power transformer. The latter approach also has the further disadvantage of requiring the series transformer to be zig-zag connected. Otherwise, the phase angle of the zig-zag phase voltages would change as the voltage is regulated.

Therefore, it would be desirable to be able to regulate the output voltage of a power transformer having a three-phase, zig-zag connected winding, without requiring any taps or regulating windings in the main power transformer, without increasing the amount of iron in the transformer, and without using zig-zag connected series or auxiliary transformers.

SUMMARY OF THE INVENTION

Briefly, the present invention accomplishes the regulation of a power transformer having a three-phase, zig-zag connected secondary winding by using auxiliary regulating transformers, and by obtaining the excitation voltages for the auxiliary transformers across the zig-zag winding phases. The voltages developed in the tapped secondary windings of the auxiliary transformers are, therefore, in phase with the zig-zag winding phase voltages, and they may be added to, or subtracted from, the phase voltages of the zig-zag winding without changing the phase enagle of these voltages. Thus, voltage regulation of the power transformers may be obtained without tapping the power transformer, without increasing the amount of iron in its magnetic core, and without requiring zig-zag connected auxiliary transformers.

BRIEF DESCRIPTION OF THE DRAWINGS

Further advantages of the invention will become more apparent when considered in view of the following detailed description and drawings, in which.

DESCRIPTION OF THE PREFERRED EMBODIMENTS

Figure 1:
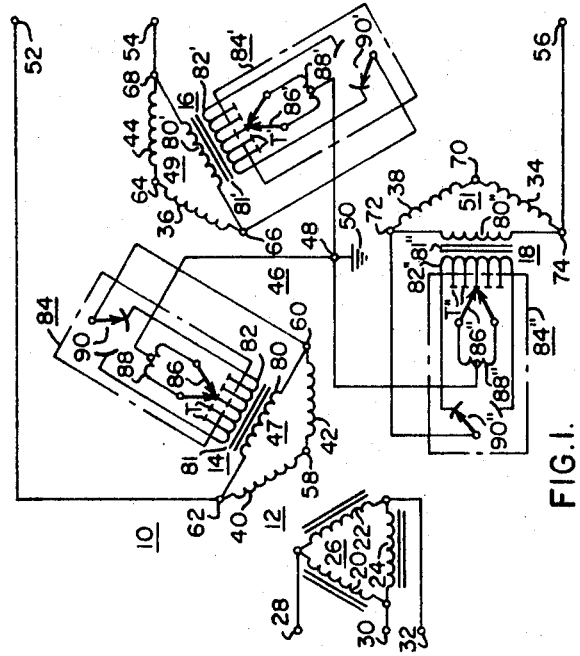
FIGURE 1 is a schematic diagram which illustrates transformer apparatus constructed and arranged according to a first embodiment of the invention.

Referring now to the drawings, and FIG. 1 in particular, there is shown a schematic diagram of regulating transformer apparatus 10 constructed and arranged according to a first embodiment of the invention. Regulating transformer apparatus 10 includes a power transformer 12, whose output voltage is to be adjusted or regulated, and three auxiliary regulating transformers 14, 16 and 18, which as will be hereinafter described, each contain tap changing means. Power transformer 12 may include three single-phase transformers, or power transformer 12 may be a single three-phase transformer. Power transformer 12 has three primary phase windings 20, 22 and 24, which may be connected in a three-phase delta configuration 26, as shown, or in Y, depending upon the specific application for the apparatus, with the three-phase primary winding being connected to input terminals 28, 30 and 32, which terminals are adapted for connection to a source of three-phase alternating potential.

Each primary phase winding 20, 22 and 24 has two secondary windings associated therewith. For example, primary phase winding 20 is associated with secondary windings 34 and 36, primary phase winding 22 is associated with secondary windings 38 and 40, and primary phase winding 24 is associated with secondary windings 42 and 44. In other words, if three single phase transformers are utilized, each transformer would include a primary winding and two independent secondary windings. If a three-phase transformer is used, each phase would include a primary winding and two independent secondary windings.

The secondary windings are connected in a three-phase, zig-zag configuration 46, which includes phases 47, 49 and 51, a neutral terminal 48, which may be grounded at 50, if desired, and three output terminals 52, 54 and 56, which are adapted for connection to a three-phase load circuit. Each phase of the zig-zag winding configuration 46 is formed by serially connecting two secondary windings associated with two different primary phase windings. For example, zig-zag phase 47 may be formed by serially connecting secondary windings 40 and 42, zig-zag phase 49 may be formed by serially connecting secondary windings 36 and 44, and zig-zag phase 51 may be formed by serially connecting secondary windings 38 and 34. This forms the conventional three-phase, zig-zag winding configuration, in which there is a phase angle of 120° between the two voltages developed in each winding section of each zig-zag phase, with the resulting zig-zag phase voltage, and phase voltage angle, being the vector across the ends of the serially connected winding sections of each phase. Thus, if secondary winding sections 42 and 40 are joined at terminal 58, the serially connected winding sections would have first and second ends at first and second terminals 60 and 62, respectively. Terminal 60 would be adapted for connection to the neutral terminal 48, and terminal 62 would be adapted for connection to output terminal 52. The output voltage of zig-zag phase 47 would be the voltage existing between terminals 60 and 62, and the phase angle of zig-zag phase 47 would be the phase angle of the voltage which appears across terminals 60 and 62.

In like manner, secondary windings 36 and 44 of zig-zag phase 49 are joined at terminal 64, with the serially connected windings having first and second terminals 66 and 68. Secondary winding sections 38 and 34 of zig-zag phase 51 are joined at terminal 70, with the serially connected winding sections having first and second terminals 72 and 74.

In the prior art, voltage adjustment or regulation of a three-phase, zig-zag winding, such as winding 46 shown in FIG. 1 is accomplished by tapping either the primary winding 26 of power transformer 12, or the secondary zig-zag winding 46 of power transformer 12. If the primary winding 26 is tapped, the output voltage of the zig-zag winding is adjusted by tap changer means connected to the taps on the primary winding 26, which may then be used to change the volts per turn. This approach, in addition to the disadvantage of tapping the main power transformer primary windings, requires that the tap changer means be insulated for the voltages which are present in the primary winding, and it also requires that the magnetic core of the power transformer be increased in size, as the regulation is accomplished through the iron circuit of the power transformer 12.

If the zig-zag secondary winding 46 is tapped, voltage adjustment is obtained through series transformer, which obtain their excitation potential through the taps on the secondary winding. Assuming, for purposes of example, that the secondary winding sections 40, 44 and 34 are tapped, any voltage developed in the series transformers from these winding sections would have the same phase angle as the voltages in these winding sections, and thus would not be in phase with the phase voltages existing between the first and second terminals of each zig-zag phase. Therefore, the series transformers would have to be zig-zag connected, in order to develop a voltage having a phase angle which would allow it to be added to, or subtracted from, its associated zig-zag phase voltage without changing the phase angle of the zig-zag winding phases.

This invention overcomes these disadvantages of the prior art arrangements, by using auxiliary regulating transformers which obtain their excitation voltage across the phases of the zig-zag windings. More specifically, as shown in FIG. 1, three auxiliary transformers 14, 16 and 18 are utilized. Auxiliary regulating transformer 14 includes primary and secondary windings 80 and 82, disposed in inductive relation with a magnetic core 81, and auxiliary transformer 14 is associated with tap changer means 84. Tap changer means 84 includes a plurality of contacts T connected to taps on secondary winding 82, a selector switch 86 for successively engaging contacts T, a preventive auto-transformer 88, for limiting the current magnitude when selector switch 88 is engaging two adjacent contacts T, and a reversing switch 90, which includes a movable contact arm, and two stationary contacts which are connected to opposite ends of the secondary windings 82. Load transfer switches (not shown) may also be included, to enable tap changer means 84 to switch under load.

Regulating transformer means 16, associated with zig-zag phase 49, and regulating transformer means 18, associated with zig-zag phase 51, are similar to regulating transformer means 14, just described, and will not be described in detail. The components of regulating transformer means 16 have been given the same reference numerals as those of regulating transformer means 14, with the addition of a single prime mark, and the components of regulating transformer means 18 have been given the same reference numerals as those of regulating transformer means 14, with the addition of a double prime mark.

The primary windings 80, 80' and 80" of the regulating transformers 14, 16 and 18 are connected across the zig-zag phases 47, 49 and 51, respectively. Primary winding 80 is connected between terminals 60 and 62 of zig-zag phase 47, primary winding 80' is connected between terminals 66 and 68 of zig-zag phase 49, and primary winding 80" is connected between terminals 72 and 74 of zig-zag phase 51. Thus, the voltage developed in secondary windings 82, 82' and 82" of regulating transformers 14, 16 and 18, are in phase with the zig-zag phase voltages 47, 49 and 51, respectively. The magnitude of the voltage in secondary windings 82, 82' and 82" depends upon the position of the tap changer selectors switch 86, 86' and 86", with respect to the end of the secondary windings connected to the movable contact arm of the reversing switches 90, 90' and 90", and the position of the reversing switches determines whether the selected voltages in secondary windings 82, 82' and 82" will be added to, or subtracted from, their associated zig-zag phase voltages.

Figure 1A:
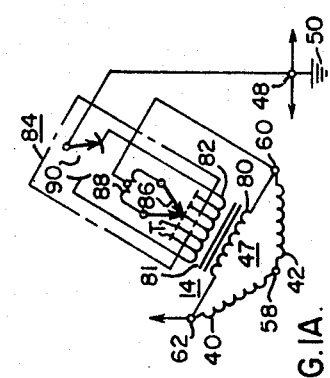
FIG. 1A is a schematic diagram which illustrates a modification which may be made to the embodiment of the invention shown in FIG. 1.

As shown in FIG. 1, it is preferable to connect the regulating voltages from the secondary windings 82, 82' and 82" between the neutral terminal 48 of the zig-zag configuration, and the first terminals 60, 66 and 72 of the zig-zag phases. As shown in FIG. 1, this may be accomplished by connecting the movable contact arm of reversing switches 90, 90' and 90" to the first terminals 60, 66 and 72 of the zig-zag phases 47, 49 and 51, and the preventive autotransformers 88, 88' and 88" to the neutral terminal 48; or, as shown in FIG. 1A, which is a schematic diagram illustrating zig-zag phase 47 of FIG. 1, the movable contact arm of the reversing switches 90, 90' and 90" may be connected to the neutral terminal 48, and the preventive autotransformers 88, 88' and 88" may be connected to the first terminals 60, 66 and 72 of zig-zag phases 47, 49 and 51.

Although it is preferable to connect the regulating voltages between the neutral terminal 48 and the first terminals 60, 66 and 72 of the zig-zag phases, since the voltages which the auxiliary regulating transformers and their associated tap changer means will have to be insulated against will be relatively low, it is also possible to connect the regulating voltages from the auxiliary transformers between the second terminals 62, 68 and 74 and output terminals 52, 54 and 56, respectively. This embodiment of the invention is shown in FIGS. 2 and 2A, with like reference numerals in FIGURES 1, 1A, 2 and 2A indicating like components.

Figure 2:
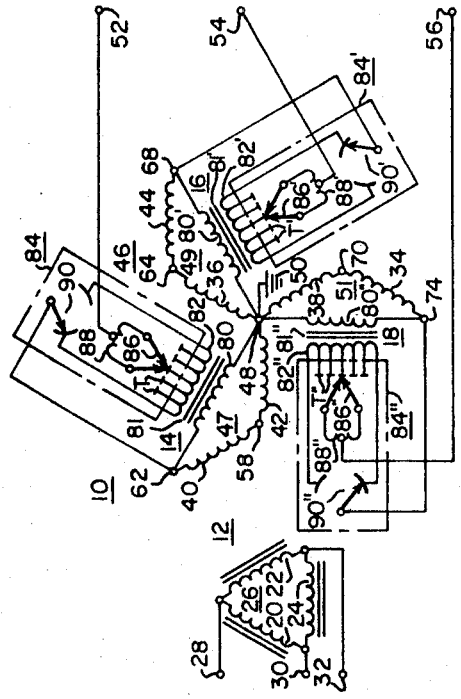
FIG. 2 is a schematic diagram which illustrates transformer apparatus constructed and arranged according to another embodiment of the invention.
Figure 2A:
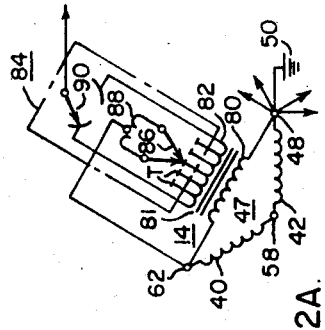
FIG. 2A is a schematic diagram which illustrates a modification which may be made to the embodiment of the invention shown in FIG. 2.

More specifically, as shown in FIG. 2, the regulating voltages may be added to, or subtracted from, the zig-zag phase voltages, by connecting the movable contact arm of reversing switches 90, 90' and 90" to the second terminals 62, 68 and 74 of zig-zag phases 47, 49 and 51, respectively, and by connecting preventive autotransformers 88, 88' and 88" to output terminals 52, 54 and 56, respectively. Or, as shown in FIG. 2A, which is a modification of the schematic diagram of FIG. 2 showing only zig-zag phase 47, the preventive autotransformers 88, 88' and 88" may be connected to the second terminals 62, 68 and 74 of zig-zag phase windings 47, 49 and 51, respectively, and the movable contact arms of the reversing switches 90, 90′ and 90″ may be connected to the output terminals 52, 54 and 56, respectively.

In summary, there has been disclosed a new and improved regulating transformer system for power transformers of the type having a three-phase, zig-zag connected secondary winding. The disclosed arrangement makes it possible to regulate the output voltage of the three-phase, zig-zag connected winding without tapping the primary or secondary windings of the power transformer, without increasing the size of the magnetic core of the power transformer, and without requiring zig-zag connected auxiliary transformers. Thus, the manufacturing and assembly of the regulating transformer system is greatly simplified, which reduces manufacturing time and cost of the system.

Since numerous changes may be made in the above-described apparatus and different embodiments of the invention may be made without departing from the spirit thereof, it is intended that all matter contained in the foregoing description or shown in the accompanying drawings, shall be interpreted as illustrative, and not in a limiting sense.

We claim as our invention:

1. Regulating transformer apparatus comprising
  first transformer means including three primary phase windings and six secondary phase windings, with each primary phase winding having two associated secondary windings; said primary phase windings being interconnected in a predetermined three-phase configuration, having input terminals adapted for connection to a source of alternating potential; said six secondary windings being connected in a three-phase, zig-zag configuration having a neutral terminal and output terminals; each phase of said zig-zag configuration including two serially connected secondary windings, having first and second terminals at the first and second ends thereof, respectively;
  first, second and third regulating transformer means, each including a first winding having taps thereon, and a second winding; the second windings of said first, second and third regulating transformer means being connected between the first and second terminals of each of the three phases of the zig-zag configuration, respectively;
  first, second and third tap changer means disposed to selectively engage taps on the first windings of said first, second and third regulating transformer means, respectively; the first windings of said first, second and third regulating transformer means and their associated tap changer means being connected to modify the output terminal voltage of said zig-zag winding configuration, while maintaining the phase angles of the zig-zag phase voltages constant.

2. The regulating transformer apparatus of claim 1 wherein the first windings of said first, second and third regulating transformers and their associated tap changer means are connected between the neutral terminal of the zig-zag configuration and the first terminals of each of the three zig-zag phase windings, respectively.

3. The regulating transformer apparatus of claim 2 wherein the first, second and third tap changer means are connected to the neutral terminal of the zig-zag winding configuration, and the first windings of said first, second and third regulating transformers are connected to the first terminals of said zig-zag phase windings, respectively.

4. The regulating transformer apparatus of claim 2 wherein the first windings of said first, second and third regulating transformers are connected to the neutral terminal of the zig-zag configuration, and the first, second and third tap changer means are connected to the first terminals of the three zig-zag phase windings, respectively.

5. The regulating transformer apparatus of claim 1 wherein the first windings of the first, second and third regulating transformer means and their associated tap changer means are connected between the second terminals of the three zig-zag phase windings and the output terminals of the zig-zag configuration, respectively.

6. The regulating transformer apparatus of claim 5 wherein the first, second and third tap changer means are connected to the output terminals of said zig-zag configuration, and the first windings of said first, second, and third regulating transformers are connected to the second terminals of said zig-zag phase windings, respectively.

7. The regulating transformer apparatus of claim 5 wherein the first windings of said first, second and third regulating transformers are connected to the output terminals of said zig-zag configuration, and the first, second and third tap changer means are connected to the second terminals of the zig-zag phase windings, respectively.

8. The regulating transformer apparatus of claim 1 including first, second and third reversing switch means connected to selectively engage either end of the first winding of said first, second and third regulating transformer means, respectively, allowing the output voltage of said three zig-zag phase voltages to be boosted or bucked by the voltage selected by said first, second and third tap changer means on the first windings of said first, second and third regulating transformers, respectively.

References Cited

UNITED STATES PATENTS

| | | | |
|---|---|---|---|
| 1,722,181 | 7/1929 | Summerhayes | 323—43.5 |
| 1,926,689 | 9/1933 | Scharl | 323—47 |
| 2,421,300 | 5/1947 | Stephens | 323—43.5 |
| 2,707,767 | 5/1955 | Prior | 323—43.5 |
| 3,254,295 | 5/1966 | Vargo et al. | 323—43.5 |

JOHN F. COUCH, *Primary Examiner.*

G. GOLDBERG, *Assistant Examiner.*

U.S. Cl. X.R.

323—47